United States Patent
Turner et al.

(10) Patent No.: US 9,614,844 B2
(45) Date of Patent: Apr. 4, 2017

(54) SYSTEMS AND METHODS TO AUTHENTICATE IDENTITY FOR SELECTIVE ACCESS TO INFORMATION RELATING TO PROPERTY

(71) Applicant: HomeAway, Inc, Austin, TX (US)

(72) Inventors: Ryan Hedley Turner, Austin, TX (US); Daniel Steven Haligas, Panama City, FL (US); Velayudhan Venugopal, Austin, TX (US); Alex Holm Devine, Austin, TX (US)

(73) Assignee: HomeAway, Inc., Austin, TX (US)

( * ) Notice: Subject to any disclaimer, the term of this patent is extended or adjusted under 35 U.S.C. 154(b) by 0 days.

(21) Appl. No.: 14/512,294

(22) Filed: Oct. 10, 2014

(65) Prior Publication Data

US 2016/0105435 A1   Apr. 14, 2016

(51) Int. Cl.
   G06F 7/04      (2006.01)
   G06F 15/16     (2006.01)
   G06F 17/30     (2006.01)
   H04L 29/06     (2006.01)

(52) U.S. Cl.
   CPC ........ *H04L 63/0876* (2013.01); *H04L 63/107* (2013.01)

(58) Field of Classification Search
   CPC .. H04L 67/306; H04L 63/0876; H04L 63/107
   USPC ....................................................... 726/1, 7
   See application file for complete search history.

(56) References Cited

U.S. PATENT DOCUMENTS

| | | | |
|---|---|---|---|
| 2010/0317323 A1* | 12/2010 | Facemire | H04L 63/0492 455/411 |
| 2012/0144452 A1* | 6/2012 | Dyor | H04L 63/0884 726/4 |
| 2013/0031598 A1* | 1/2013 | Whelan | G01S 1/725 726/1 |
| 2014/0289827 A1* | 9/2014 | Tang | H04L 63/107 726/6 |
| 2016/0104216 A1 | 4/2016 | Turner et al. | |

OTHER PUBLICATIONS

Todd D. Hodes; Composable ad hoc location-based services for heterogeneous mobile clients; Wireless Networks 5 (1999) 411-427.*

* cited by examiner

*Primary Examiner* — Monjour Rahim
(74) *Attorney, Agent, or Firm* — Knobbe, Martens, Olson & Bear, LLP

(57) ABSTRACT

Credential and/or location data included in data received by a networked system from a device that communicated the data to the networked system may be processed to determine if the credential data and/or location data validate an identity of a user (e.g., a guest, traveler, patron) and/or a location of the user based on a location of the device when the data is communicated. The data may be review data and the credential and/or location data may be included in review data. The device and/or the networked system may generate a location history database from location data from the device or other system that is periodically logged from multiple locations at different times during an event (e.g., a stay at a vacation rental). Data from the database may be used to determine if a location for a communication is with a threshold of an allowable distance from an allowable location.

20 Claims, 9 Drawing Sheets

SYSTEMS AND METHODS TO AUTHENTICATE IDENTITY FOR SELECTIVE ACCESS TO INFORMATION RELATING TO PROPERTY

FIELD

The present application relates generally to systems, software, electronic messaging, mobile computing and communication devices, commerce, and electronic commerce. More specifically, systems, methods and software to authenticate identity are disclosed.

BACKGROUND

Travelers and owners may both benefit from goodwill associated with a positive experience the traveler has in regards to a stay at a rental owned by the owner. In some scenarios, the stay may be related to a date and/or time range that the traveler arrives or checks into a vacation rental and another date and/or time that the traveler checks out of the vacation rental, for example. In some instances, the traveler may wait until some period of time has passed before taking the time to generate a review of the property at which the traveler stayed. In some examples, the traveler may have had a positive review of the property (e.g., 4 or 5 stars in a five star system where 5 stars is the highest approval rating and 1 star is the lowest approval rating). After the passage of time the travelers recollection of their experience may change, and what would have been a positive review may turn into a more negative review (e.g., 3 stars or lower).

A less than positive review that may occur due to a travelers change in circumstances after the stay or due to a traveler's lack of accurate recollection about the stay may lead to reviews of the property that do not accurately reflect the actual sentiment the traveler had during the stay. Stays that are accurately reviewed as being positive may benefit both traveler and owner by increasing rental opportunities for the owner and by leaving a favorable impression on the traveler that may result in future stays by the traveler. Moreover, some owners may not directly manage some or all of the aspects of the logistics of a stay and may defer some or all tasks to an agent or vacation rental company. Stays that are accurately reviewed as being positive may also benefit the agent/vacation rental company by generating good will that may garner new and repeat stays from individuals who read the positive reviews.

Generally, in some industries (e.g., hospitality) or services (e.g., restaurants) where patrons or guests provide feedback, typically in the form of a review, ensuring that the review is legitimate, that is, the review was completed by a guest who actually experienced the subject of the review (e.g., a traveler during a vacation stay at a vacation rental) is based on an honor system. Accordingly, there are likely to be reviews that are fraudulently submitted by a person who did not actually experience the subject of the review. As a result, a party having a proprietary interest in receiving authentic reviews (e.g., an owner of a vacation rental unit or a proprietor of a restaurant) may have their reputation and/or good will damaged by fraudulent reviews that may include negative impressions of an experience. Further, the party having the proprietary interest may garner an undeserved reputation and/or good will due to positive reviews that are fraudulently submitted (e.g., reviews submitted by the owner or proprietor). Fraudulent reviews may arise in part due to a lack of adequate validation and authentication mechanisms.

Thus, there is a need for devices, systems, methods and software that facilitate authentication and validation of review of an event.

BRIEF DESCRIPTION OF THE DRAWINGS

Various embodiments or examples ("examples") of the present application are disclosed in the following detailed description and the accompanying drawings. The drawings are not necessarily to scale.

DETAILED DESCRIPTION

Various embodiments or examples may be implemented in numerous ways, including as a system, a process, a method, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1A:
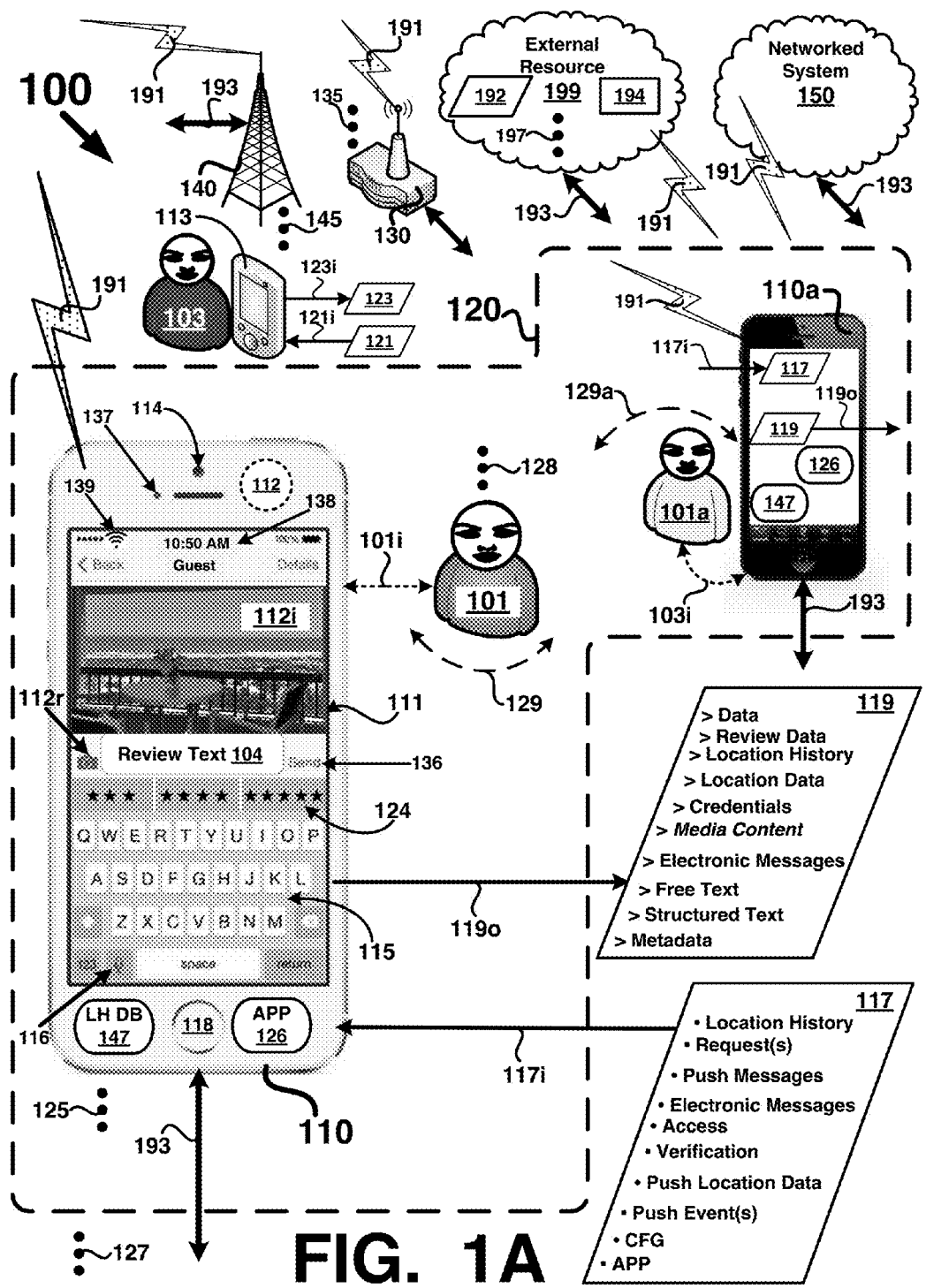
FIG. 1A depicts one example of a block diagram of a system for authentication of credentials and/or location.

Attention is now directed to FIG. 1A where one example of a block diagram of a system 100 for authentication of credentials and/or location is depicted. In FIG. 1A a guest 101 (e.g., a traveler), and optionally an associate guest 101*a* (guest 101*a* hereinafter) (e.g., another person traveling with guest 101) may be experiencing an event 120 at a location, such as a stay at a vacation rental property, for example. There may be more than one guest 101 and there may be one or more other individuals associated with guest 101, such as the guest 101a (e.g., spouse, friends, domestic partner, relatives, children, business associates, etc.), as denoted by 128. Guest 101 and/or guest 101a may be mobile (129, 129a) and may move or otherwise travel to/from one or more other events denoted by 127 while at the location, such as visits to bars, restaurants, entertainment venues, businesses, parks, sporting events, local attractions, shopping, etc. The location where one or more events may occur (e.g., event 120 or other events 127) may include but are not limited to a city, a town, a ship, a resort, a park, a festival, a hotel, a motel, etc. The location may cover a small area (e.g., 100 meters or less) or a large area (100 miles or less), for example.

Guest 101 may have a client device 110 (e.g., a smartphone, tablet, pad, laptop, PDA, gaming device, etc.) that may be in communication with other systems and/or resources, such as a wireless 191 and/or a wired 193 communications link, an external resource 199 (e.g., Internet, Cloud, etc.), a networked system 150, a wireless access point 130, a cellular communications network 140, just to name a few. There may be more than one client device 110 as denoted by 125, for example. Guest 101a may have a client device 110a. Guest 101 and/or guest 101a may have additional client devices (not shown), such as a tablet or pad, for example. There may be more or fewer wireless access points 130 and/or cellular communications network 140 than depicted in FIG. 1A. Data communications between the client devices (e.g., 110, 110a) and the networked system 150 may be direct (e.g., via 191 and/or 193) or may be routed through one or more other portal computing devices, such as wireless access points 130 and/or cellular communications network 140, for example.

Wireless communications may include but is not limited to WiFi, WiMAX, Bluetooth, near filed communications (NFC), and cellular (e.g., 2G, 3G, 4G), for example. Wired communications may include but is not limited to local area network (LAN), universal serial bus (USB), FireWire, and Lightning, for example. External resource 199 may include and/or have access to computing resources 194 and data storage resources 192, and there may be more or fewer computing resources 194 and data storage resources 192 than depicted as denoted by 197. Networked system 150 may also include and/or have access to networked computing and data storage resources (not shown).

As one non-limiting example of an event, guest 101 may be a traveler who has booked a reservation for a stay at a vacation rental property in a location (e.g., Stowe, Vt.). The stay may include typical beginning dates and/or times and ending dates and/or times, such as a check-in time and date and a check-out time and date, for example. An owner 103 of the vacation rental property may desire positive reviews from the guest 101 and the guest 101 may desire a positive stay experience. A positive stay experience may be evidenced by a positive review drafted by the guest 101 using client device 110 and its associated systems (e.g., keyboard 115, display 111, camera 112, microphone 137, APP 126, etc.) to draft the review. System 100 may be operative to allow the guest 101 to provide the review during a time period that may be contemporaneous with the event 120 and/or other events 127. For example, if the stay will end at a 12:00 PM check-out time on the end date for the stay, it may be desirable for the guest 101 to draft the review prior to the check-out time because the experience of the stay may be still fresh in the mind of the guest 101. Accordingly, guest 101 may interact with 101i the client device 110 to enter data relevant to the experience the guest 101 had during his/her stay for event 120. Moreover, an application 126 (APP) executing on client device 110 may notify (e.g., directly or from a Push-message received by device 110) or otherwise remind guest 101 to review the event 120 using one or more systems of client device 110, such as display 111, a vibration engine (not shown), a microphone 137, speakers (not shown), and a user interface (UI), such as keyboard 115, for example. The APP 126 may receive and/or generate messages or images displayed on display 111 of client device 110 to remind or otherwise prompt guest 101 to proffer a review of the event 120.

The review may include media content, such as a video and/or a still image captured using an image capture system of client device 110, such as a first camera 112 (e.g., a rear facing camera) or a second camera 114 (e.g., a front facing camera). APP 126 may prompt (e.g., using audio, video, text, vibration, etc.), guest 101 to capture an image of a favorite aspect of the event, such as a view afforded by the vacation rental. To that end, guest 101 may capture an image 112i of an ocean view to be included in the review using first camera 112. Other types of images, such as a self-portrait (e.g., a selfie) of the guest 101 and/or guest 101a enjoying the beach or other aspect of the event 120. For example, second camera 114 may be used to capture an image for a selfie with the image including some aspect of the event in the background. APP 126 may activate an icon, such as a camera icon 112r as a reminder for the guest 101 to capture media content for the review. A microphone icon 116 may be activated by APP 126 to prompt or otherwise remind the guest 101 to include audio, a sound clip (e.g., ocean sounds) or voice commentary for the review using microphone 137. Keyboard 115 may be used by guest 101 to enter review text 104 to be included in the review of the event 120. In some examples, the review text 104 being entered on client device 110 is for an amended review of the event 120. The text entered by guest 101 may be free text as typed or otherwise entered by guest 101 using keyboard 115, voice-to-text application, or other interface device (e.g., a Bluetooth keyboard paired with client device 110). APP 126 may present event rating choices on display 111, such as a five-star rating system 124 for the guest 101 to select the star rating that most closely matches his/her sentiment regarding the stay, such as four to five stars for a favorable experience, three stars for an acceptable experience, and one to two stars for an unfavorable experience, for example. The star rating may be structured text that is selected from icons or other objects presented on display 111 (e.g., a touchscreen display) such as separate selectable fields for each star rating as depicted by 124. In other examples, structured text may include data created by a drop down menu or check boxes, for example.

APP 126 or other component of system 100 may solicit or otherwise notify or prompt guest 101 to proffer the review at a time that is near the end time and/or date for the stay. As one example, if the check-out time for the last day of the stay is 12:00 PM, then at time of 10:50 AM (e.g., as determined by a clock 138 on client device 110), the guest 101 may be reminded to compose a review of the event 120 (e.g., contemporaneous with the stay) before the check-out time. The reminder may include but is not limited to an electronic message, a voice mail, a text, an email, a tweet, an instant message, vibrating client device 110, information presented on display 111, just to name a few. As described above, the reminder may include a request for the guest 101 to capture media content for the review of the event 120 (e.g., image 112i). After the guest 101 has completed composing the review, including media content, if any, a send icon 136 or return/enter key on keyboard 115 may be activated to communicate data for the review (e.g., review data) to an external system using one or more communications systems of client device 110, such as one or more wired 193 (e.g., USB, Lightning, LAN) and/or wireless 191 (e.g., WiFi, Cellular, NFC, Bluetooth), communications interfaces. In FIG. 1A, the external system that receives the data transmitted by the client device 110 may be a portal computing device, such as a wired and/or wireless router, a wireless access point, a cellular network (e.g., one or more cellular towers and/or antennae). Non-limiting examples of computing devices that may be operative as an external system include but are not limited to wireless access points 130, cellular communications network 140, external resource 199, networked system 150, or some combination of the foregoing.

APP 126 and/or other systems in communication (191, 193) with APP 126 via client device 110 may operate to ensure that the review is legitimate and originates from a location that is consistent with a location for the event 120. APP 126 may access from client device 110 and/or external systems (e.g., external resource 199 or other), location data (e.g., GPS, geolocation or other locations based services) and/or credential data associated with client device 110 (e.g., access credentials for WiFi and/or wired networks) and/or guest 101. Location data from portal computing devices (e.g., 130, 140) may be used in addition to or instead of location data from client device 110 to determine location. In some examples, location data may include information on radio frequency (RF) signals emitted by client device 110, such as received signal strength indicator (RSSI), RF signal strength, or data included in packets or other data structures included in a RF transmission from client device 110 (e.g., MAC Address, IP address, Bluetooth address, etc.). Biometric or other data may be used to verify identity and/or credentials of guest 101, such as a biometric sensor 118 (e.g., a fingerprint reader or scanner) on client device 110, voice print analysis, facial image recognition (e.g., using camera 114, 112) or others.

Owner 103 or an agent acting on behalf of owner 103 may provide as part of the event 120, access credentials to a WiFi network (e.g., a wireless router/access point 130 at the vacation rental) for guest 101 to access during the stay. Availability of the WiFi network at the event 120 may be displayed by icon 139 on client device 110. APP 126 may access via client device 110 wireless address information (e.g., MAC address, Bluetooth ID, etc.) of the client device 110 and other wireless devices the client device 110 communicates with. Received signal strength indicator (RSSI), RF signal strength, signal ping times, or other indicators may be used to verify credentials of client device 110 associated with guest 101 and/or proximity of the client device 110 with a portal computing device, such as the wireless access point 130 and/or cellular network 140, for example. As one example, if guest 101 is given access credentials (e.g., SSID and wireless network key/password) for a wireless network provided by the owner 103 for use by guests at the vacation rental unit, then access to that network via client device 110 may be used by APP 126 to provide data to an external system to verify that a review data transmitted by client device 110 matches credentials for the event 120. Transmitted data that includes the review data may also include fields (e.g., in one or more packets, headers, etc.) or metadata that includes client device 110 credentials and/or access credentials for the wireless network the client device 110 is in communication with (e.g., wired and/or wireless link 191 between 110 and 130 and/or 110 and 140).

Location tracking capabilities and/or systems accessed by or available to client device 110 may be used to determine if review data is originating from a locus within a range of the event 120 (e.g., measured in distances of feet, meters, miles, kilometers, etc.). For example, if the stay for event 120 is in Lake Tahoe, Calif. and the location data indicates the review data is being communicated from Las Vegas, Nev., then the distance between Lake Tahoe, Calif. and Las Vegas, Nev. may be outside a locus for a legitimate location for the review data to originate (e.g., several hundred miles between the event and the origin of the review data). Further to the example, if the review and associated media content are to be composed while the guest 101 is at the event 120 (e.g., in-situ from a room of the vacation rental), then the locus may be 30 meters of less. All events need not be tied to a rental and some events may take place at a bar, restaurant, arena, stadium, and the locus may be a larger or smaller distance based on the type of event. As another example, if the event occurs in a national park, the locus may be 50 miles or less. Actual values for the locus may be application dependent and are not limited to the examples herein. Cellular communications networks 140 located near event 120 may be used to verify location for guest 101 via one or more cellular communications networks 140 (e.g., cell towers) that are accessed by client device 110 (e.g., client device 110 having 2G, 3G, 4G cellular radios). Wide area and/or public WiFi networks, such as WiMAX, located in vicinity of event 120 and detected and/or accessed by client device 110 and/or by the WiMAX network, may be used to determine location data for a client device 110 associated with guest 101. Although a locus may be determined by geo-location data, a locus may also be determined by information and/or signals including but not limited to location data from systems internal to the client device 110, location data from systems external to the client device 110 (e.g., external resource 199, 180, 130, 140), location data from systems internal to a communications interface (e.g., 180, 130, 140), location data from systems external to (e.g., external resource 199) a communications interface (e.g., 180, 130, 140), radio frequency (RF) signal strength as measured by a communications interface (e.g., 180, 130, 140) in communications with the client device 110, RSSI as measured by a communications interface (e.g., 180, 130, 140), signal ping times as measured by a communications interface (e.g., 180, 130, 140), just to name a few, for example. As one example, location data may be determined to be unreliable and/or unverifiable if RSSI in RF signals transmitted by the client device 110 are below a threshold value, and/or if RF signal strength from RF signals transmitted by the client device are below a threshold value. RSSI and/or RF signal strength that are below their respective threshold values may be indicative of a distance between the client device 110 and a communications interface (e.g., 180, 130, 140) being too great for the client device 110 (e.g., and its associated guest 101) to be within a locus of the event.

As another example, location data and/or credential data associated with owner device 113 if received in data associated with a stay by guest 101 at a vacation rental of owner 103 may be invalidated or ignored because the location data is outside the locus for the event (e.g., event is in Lake Tahoe, Calif. and the owner 103 lives in Dallas, Tex. and the location data from owner device 113 is consistent the review data originating near Dallas, Tex.). Similarly, access credentials used by owner device 113 may not match those for the WiFi network at the vacation rental. Although and owner 103 was used as an example, the location data and credential data from other non-guest devices may lead to the same result, invalidation of fraudulent or erroneous review data due to that data not matching the expected location data and/or credentials data.

In other examples one or more events may include one or more locus associated with those events and an external system that receives data from a computing device (e.g., client device 110) directly or indirectly from a portal computing device (e.g., wireless access point 130), may extract location data from the received data and determine if that location data is within a threshold of an allowable distance from an allowable location. An allowable distance may be computed by a networked computing device that receives the data (e.g., via a communications interface in communication with the networked computing device) and an allowable location may be stored data in a data storage resource, data store, data base or other resource that is accessed by the networked computing device. Each event may include its own allowable location and may also include its own allowable distance. As one example, if the event is a stay at a rental property and the portal computing device is the wireless access point 130 that is positioned at the rental property, then location data extracted from data transmitted by the client device 110 may be processed by the networked computing resource to extract the location data from the received data. The location data may include location data for the portal computing device and/or RF signal data related to the wireless link between the portal computing device and the client device 110.

Accordingly, if the vacation rental is a 1250 sq ft, two story condo unit and the wireless access point 130 is positioned on the first floor of the condo, if the extracted location data indicates the client device 110 is positioned approximately 50 meters way from the wireless access point 130, then that distance may not be an allowable distance from the event based on the allowable location (e.g., inside one of the rooms of the rental property). In this example, a distance of 50 meters (e.g., more than 150 feet) is not likely to be consistent with an allowable distance (e.g., approximately 10 meters or less) for a data transmission to have originated from somewhere inside the 1250 sq ft condo (e.g., an allowable location). An image captured of the event (e.g., a room or view from the condo) is less likely to have not been captured at the allowable location based on the position of the client device 110 being approximately 50 meters distant from the portal computing device 130. Metadata included in the image captured by the client device 110 may include embedded location data from systems and/or services available to the client device 110 and metadata may be processed to extract the embedded location data. The embedded location data may be analyzed by the networked computing device to determine that the location of the image is not within the threshold for the allowable distance for the allowable location.

As another example, a stay may include attendance by guest 110 at a music festival as the event (e.g., Outside Lands in San Francisco, Calif., Newport Jazz Festival, SXSW in Austin, Tex., Monterey Jazz Festivals, etc.). The event may take place in a large outdoor area (e.g., a park) and may also include one or more indoor venues, such as night clubs, auditoriums, theaters, etc. Some locations at the event may include known wireless access points, such as WiMAX or WiFi routers for example. Other locations may not have traditional WiFi access and longer range portal computing devices, such as cellular communications networks (e.g., one or more of 140) may be used to wirelessly link with a computing device, such as client device 110 of guest 101 while the guest 101 is attending the event. The event (e.g., music festival) being attended by guest 101 may or may not be associated with other events, such as a stay event at a vacation rental in a local near the music festival, for example.

To the example, the threshold for an allowable distance for an allowable location at the music festival (e.g., in the outdoor grounds) may typically be a larger allowable distance than would be the case for a vacation rental unit. For example, the threshold for an allowable distance may be approximately a hundred feet or more. Portal computing devices (e.g., WiFi and/or WiMAX) at the music festival and/or longer range portal computing devices (e.g., cellular communications networks) may be used to receive data from the client device 110 and then communicate that data to the networked computing device. Smaller or more intimate venues at the music festival (e.g., a night club) may include a wireless access point (e.g., 130) and the threshold for an allowable distance for an allowable location may typically be smaller (e.g., approximately 50 feet or less) than would be the case for larger outdoor events (e.g., approximately 100 feet or more).

In that there may be multiple locations at the music festival consistent with attendance/presence of the guest 101 and their client device 110, there may be multiple allowable location and multiple threshold allowable distances that may be accessed by the networked computing device to validate the location of the client device 110 and to form validated location data, for example. Validated locations for the client device 110 and validated location data may be used to allow access to the networked computing device and/or other systems in networked system 150. Access may include data communications access and upon allowing access, data from the client device 110 may be acted on by the networked system 150 (e.g., via processing by networked computing device). As one example, if the data includes review data of one or more attractions at the music festival event, then a validated location and validated location data may be used to allow access to the networked computing device to generate a review data file that may be distributed or otherwise published (e.g., electronically) as a review of the event.

In FIG. 1A, APP 126 executing on a computing system of client device 110 may access hardware and/or software systems and/or resources of client device 110 to transmit 119*o*, data 119 to one or more external systems (e.g., networked system 150). Data 119 may include but is not limited to location data, location history data, credentials, review data, amended review data, media content, free text, structured text, metadata, and electronic messages, for example. APP 126 may receive 117*i*, data 117 from one or more external systems (e.g., networked system 150). Data 117 may include but is not limited to request(s) (e.g., to compose a review), push messages (e.g., to compose a review, information on other events for guest 101 to consider), electronic messages (e.g., text, email, tweets, IM's), verification data (e.g., location data, access credential data), push location data (e.g., location data for other events the guest 101 may partake in), location history, push events (e.g., events related to offers from business for the guest 101 to consider), applications (APP's) for client device 110, and configuration data (CFG) (e.g., to configure client device 110). In some example, the external system that transmits the data 117 (e.g., networked system 150) may only do so after data 119 has been verified by the external system so that client device 110 has been granted data communications access to the external system. Data communications access may be allowed after data (e.g., 117) received from a computing device (e.g., client device 110) has been authenticated as to credential data, verified as to location data, or both.

As will be described below, after review data (e.g., 119) transmitted by APP 126 via client device 110 is received by one or more external systems, the review data may be verified (e.g., for location data and/or credential data) and formatted for publication (e.g., to a web page, bulletin board, newsletter, etc.). A verified review may be queued for publication at a later time and prior to being published; owner device 113 may receive a version of the pending review for owner 103 to consider and optionally act on before the review is published to a broader audience (e.g., people searching for vacation rentals for future stay dates). Owner device 113 may receive 121i a pending review (e.g., in an email message or other form of electronic messaging). If the review is suboptimal (e.g., less than four stars or free text indicating guest dissatisfaction), owner 103 may uses owner device 113 or some other device to either contact the guest 101 to cure any grievance the guest 101 may have or to amend the review to rebut the suboptimal review. In some examples, the owner 103 may have cured the cause for the suboptimal review and the owner 103, guest 101 or both may communicate (119o, 123o) an amended review that will be published instead of the initial review. Accordingly, output 123o from owner device 113 may include data 123 for an amended review or data used to cure the grievance of guest 101, for example. An application executing on owner device 113 may process incoming data 121 and outgoing data 123.

Figure 1B:
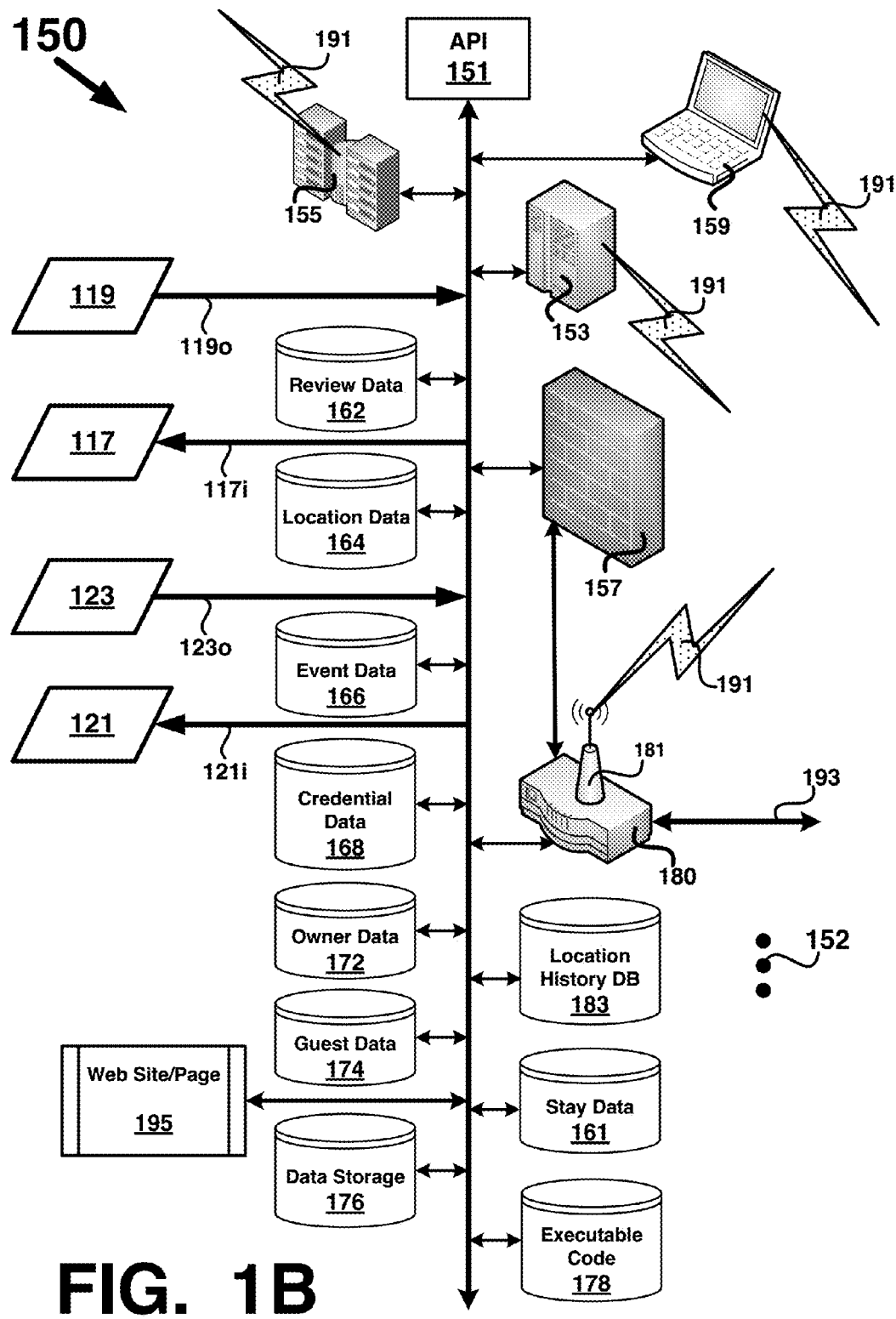
FIG. 1B depicts one example of a block diagram of a networked system including a networked computing device operative to receive and validate data for authentication of credentials and/or location.
Figure 1C:
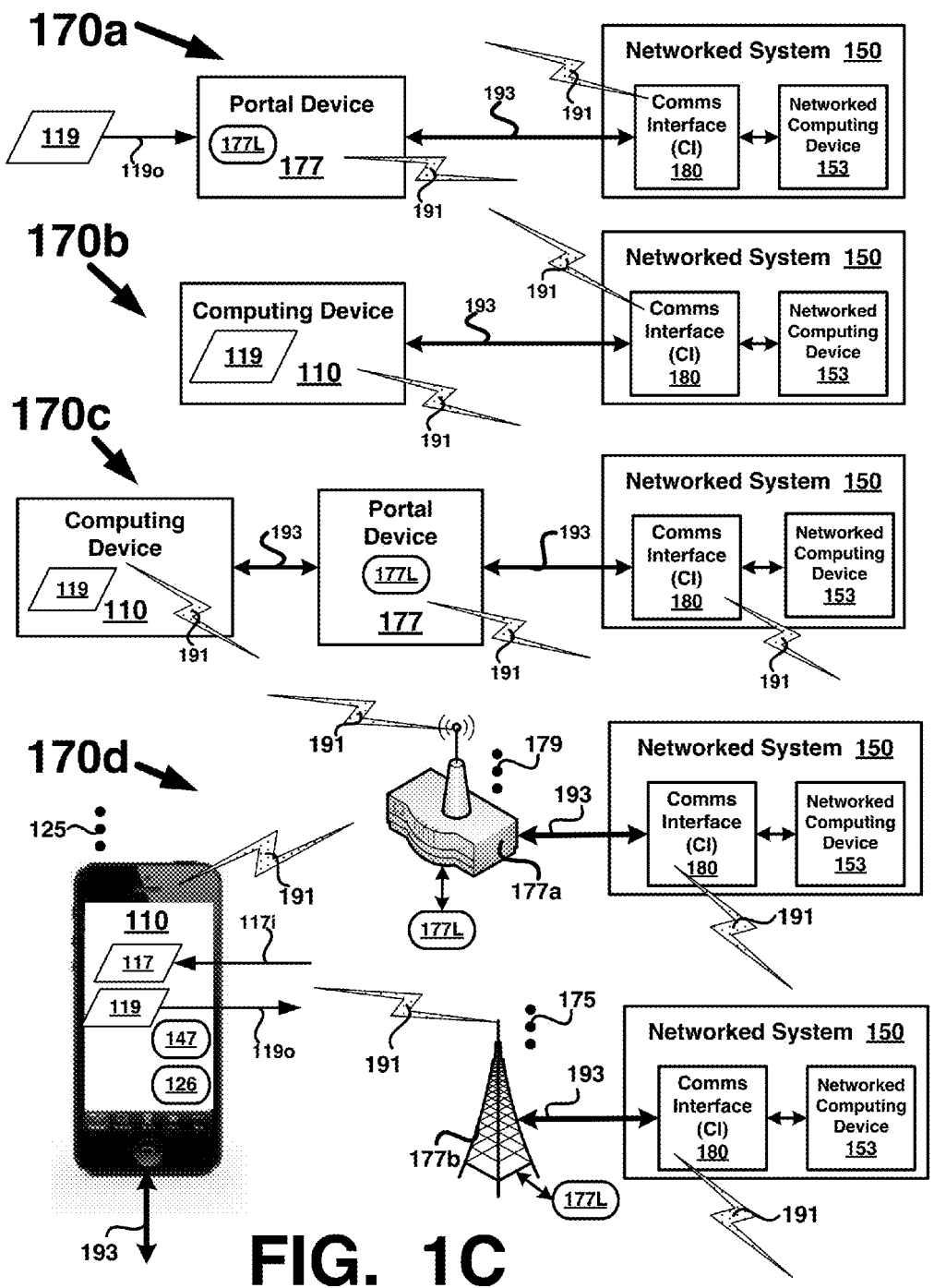
FIG. 1C depicts examples of a computing device and a portal computing device in communications with a networked system including a networked computing device that receives data transmitted by the computing device and/or portal computing device.
Figure 2:
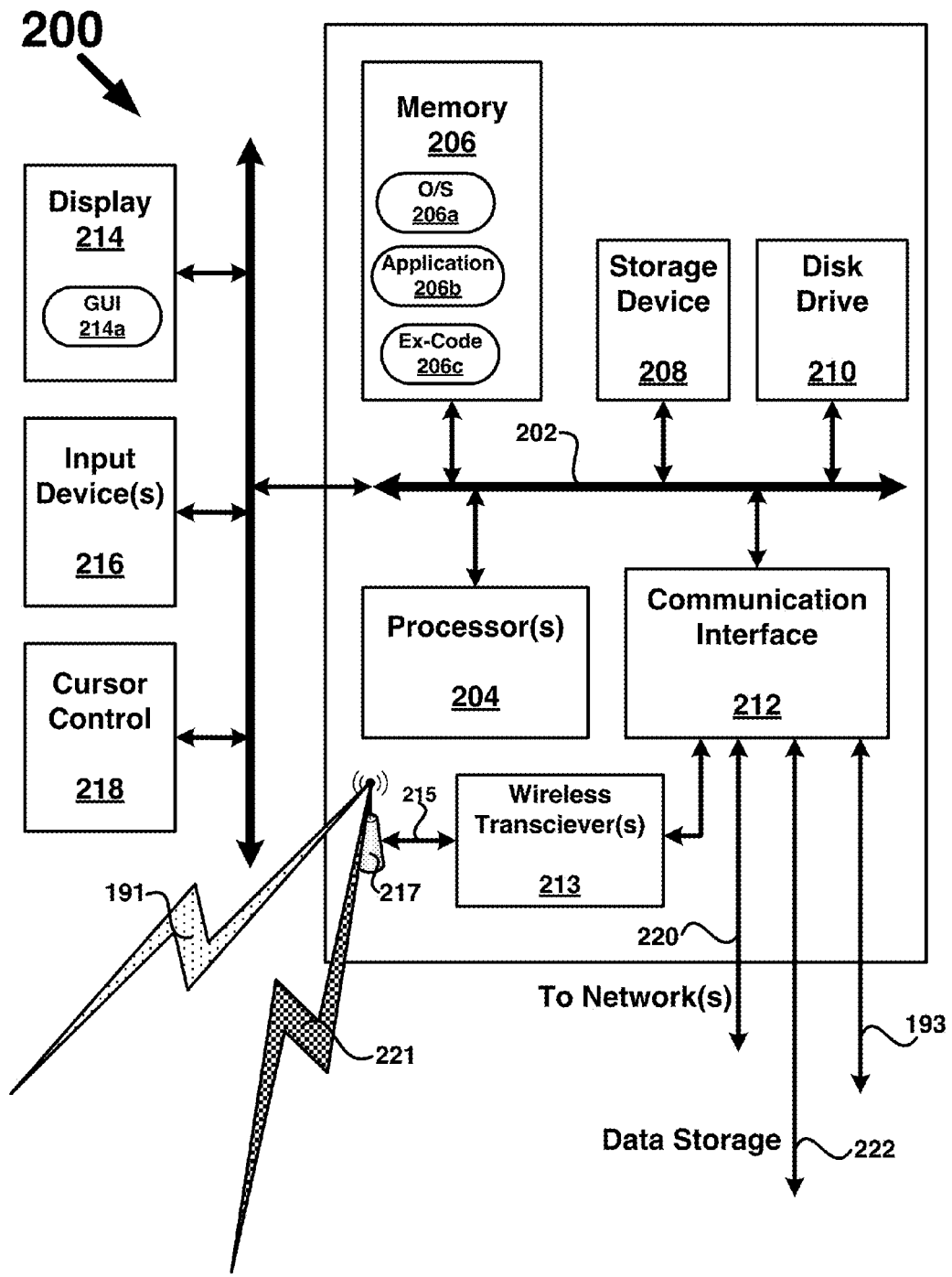
FIG. 2 depicts one example of a computer system.

FIG. 2 illustrates an exemplary computer system 200 suitable for use in one or more systems, devices, compute engines, apparatus, client devices, wireless devices, wireless systems, backend systems, front end systems, host devices or others described in reference to FIGS. 1A-1C and 3A-6. In some examples, computer system 200 may be used to implement computer programs, algorithms, an application (APP), an application programming interface (API), configurations, methods, processes, or other software to perform the above-described techniques. Computer system 200 may include a bus 202 or other communication mechanism for communicating information, which interconnects subsystems and devices, such as one or more processors 204 (e.g., μC, μP, DSP, ASIC, FPGA, Baseband, etc.), system memory 206 (e.g., RAM, SRAM, DRAM, Flash), storage device 208 (e.g., Flash, ROM), disk drive 210 (e.g., magnetic, optical, solid state), communication interface 212 (e.g., modem, Ethernet, WiFi, Cellular), display 214 (e.g., CRT, LCD, LED, OLED, touch screen), input device 216 (e.g., keyboard, stylus, touch screen, mouse, track pad), and cursor control 218 (e.g., mouse, trackball, stylus). Some of the elements depicted in computer system 200 may be optional, such as elements 214-218, for example, and computer system 200 need not include all of the elements depicted. Display 214 may present a user interface (UI), such as a graphical user interface (GUI) 214a. Memory 206 may include computer executable programs and/or data embodied in a non-transitory computer readable medium, such as an operating system (OS) 206a, an application (APP) 206b, and executable code (Ex-Code) 206c, for example.

According to some examples, computer system 200 performs specific operations by one or more processors 204 executing one or more sequences of one or more instructions stored in system memory 206. Such instructions may be read into system memory 206 from another non-transitory computer readable medium, such as storage device 208 or disk drive 210 (e.g., a HDD or SSD). In some examples, circuitry may be used in place of or in combination with software instructions for implementation. The term "non-transitory computer readable medium" refers to any tangible medium that participates in providing instructions and/or data to processor(s) 204 for execution. Such a medium may take many forms, including but not limited to, non-volatile media and volatile media. Non-volatile media includes, for example, optical, magnetic, or solid state disks, such as disk drive 210. Volatile media includes dynamic memory, such as system memory 206. Common forms of non-transitory computer readable media includes, for example, floppy disk, flexible disk, hard disk, SSD, magnetic tape, any other magnetic medium, CD-ROM, DVD-ROM, Blu-Ray ROM, USB thumb drive, SD Card, any other optical medium, punch cards, paper tape, any other physical medium with patterns of holes, RAM, PROM, EPROM, FLASH-EPROM, any other memory chip or cartridge, or any other medium from which a computer may read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media may include coaxial cables, copper wire, and fiber optics, including wires that comprise bus 202 for transmitting a computer data signal or other signals (e.g., from hardware or circuitry). In some examples, execution of the sequences of instructions may be performed by a single computer system 200. According to some examples, two or more computer systems 200 coupled by communication link 220 (e.g., LAN, Ethernet, PSTN, USB, or wireless network) may perform the sequence of instructions in coordination with one another. Computer system 200 may transmit and receive messages, data, and instructions, including programs, (i.e., application code), through communication link 220 and communication interface 212. Received program code may be executed by processor 204 as it is received, and/or stored in disk drive 210, or other non-volatile storage for later execution. Computer system 200 may optionally include a wireless transceiver 213 coupled with the communication interface 212 and coupled 215 with an antenna 217 for receiving and generating RF signals (191, 221), such as from a WiFi network, WiMAX network, BT radio, Cellular network, networked computing resources, external resource 199, client devices (e.g., 110), owner devices (e.g., 113), near field communication (NFC), satellite network, data storage network, or other wireless network and/or wireless devices, for example. Examples of wireless devices (e.g., client devices) may include but is not limited to those depicted in FIGS. 1A-1C, 5 and 6. Communications interface 212 may be coupled 222 with data storage external to computer system 200. Communications interface 212 may be coupled 193 with external resources and/or systems, such as those depicted in FIGS. 1A-1C, 5 and 6, for example. Computer system 200 may be used to implement a computing device (e.g., 110, 110a, 113), a portal computing device (e.g., 130, 140, 180), a networked computing device (e.g., 153, 155, 159), a networked system (e.g., 150), and an external resource (e.g., 199), for example.

Moving on to FIG. 1B, where one example of a block diagram of a networked system 150 including a networked computing device operative to receive and validate data 119 for authentication of credentials and/or location is depicted. The data 119 may be used to generate a review data file based on review data included in the data 119 and generated from an in-situ evaluation (or amended versions of an in-situ evaluation) of an event by a guest, traveler, user, customer, client or the like. Networked system 150 may be in wired 193 and/or wireless 191 communications with other devices and systems, including but not limited to external resource 199 and its associated resources (192, 194), client device 110, owner device 113, and devices of guests 101a, just to name a few. Networked system 150 may include resources in communications with one another, that may include but is not limited to an application program interface (API) 151, one or more laptop computers 159, one or more servers 153, a communications interface 180 that may include wireless 191 and wired 193 links, firewall 157, one or more server farms 155, data storage 176, review data 162, location data 164, location history data 183, (e.g., a location history data base), event data 166, credential data 168, owner data 172, guest data 174, stay data 161, and executable code 178. In some examples, data storage 176 may include one or more of the other data storage categories (e.g., 162-174, 178, 183). In other examples, data storage resources accessed by networked system 150 may be external to networked system 150 (e.g., positioned in external resource 199). One or more of the flows depicted in FIGS. 3A-4 may be implemented using executable code 178 and/or API 151, for example. For purposes of explanation, a computing resource (e.g., 153, 155, 159) depicted in FIG. 1B may be referred to as a networked computing device and a data storage resource (e.g., 162-174, 178, 183) may be referred to as data storage. For example, data 119 may be received by networked computing resource 153 via communications interface 180. In some examples, a computing device that transmitted the data 119 may be referred to as a client device (e.g., 110).

Review data 162 may include review data and/or amended review data (119, 123), and may include formatted reviews for publication or queued for publication (e.g., at some later time, such as after owner 103 has had an opportunity to review, cure or rebut a pending review). Review data 162 may include location data and/or credential data from a guest device (e.g., 110) that may be compared to location data in 164 and/or credential data in 168. Review data 162 may include review data files for formatted reviews and may include amended review data files. In some examples, data 119 includes amended review data.

Location data 164 may include locations (e.g., GPS data and/or other location data) associated with events (e.g., events in 166) and locations around events (e.g., in approximately the same locale as an event). Location data 164 may include locations associated with owners 103 for use in verifying location data for amended review data transmitted by an application executing on an owner device (e.g., 113). Examples of location around an event may include but are not limited to a park across the street from an event, a cafe of coffee shop down the street from an event, etc. Examples of owner locations may include location data associated with use of the owner device 113, such as location data from cellular networks (e.g., in the city or state the owner lives in), WiFi networks, WiMAX networks, etc.

Event data 166 may include data for events, such as a stay at a vacation rental, an entertainment venue, a bar, a grocery store, a bakery, goods, services, business, restaurants, etc. that may be the primary event for guest 101 or may be associated with activities the guest 101 partakes of during his/her stay at the primary event (e.g., the stay at the vacation rental).

Location history data base 183 may include location data tracked and stored over time based on various locations visited by guest 101 with a computing device (e.g., client device 110) that includes or has access to internal/external sources of location data. Validation of location may include accessing data in location data 164, location history data base 183, or both. In some examples, a computing device that communicates the data 119 may include location history data base (LH DB) 147 which may include the same or different data than location history data base 183. In some examples location data in one of the location history data bases may be used to update and/or replace location data in the other location history data base. For example, location data in LH DB 147 of client device 110 may be received 119 and stored in location history data base 183. As another example, location data in location history data base 183 of client device 110 may be received 117 and stored in LH DB 147.

Credential data 168 (e.g., access credentials, user name, password, etc.) may be a data store where access data is retained for various events, owner properties, etc. For example, credential data 168 may include credentials for WiFi access points in owner properties, businesses that may be promoted by the owner 103 or by an agent acting on behalf of the owner, etc. Other forms of credentials may be included in credential data 168, such as access credentials for guest devices, locks or doors needed to gain access to a rental property or other protected area associated with a stay at an event, for example.

Owner data 172 may include data about owners (e.g., 103), such as property addresses, owner address and contact information, email accounts, account information for a vacation rental agency the owner uses to manage stays by guests, data on owner devices 113 (e.g., MAC address or other forms of device ID, etc.). Guest data 174 may include data about guests (e.g., 101), such as addresses and contact information, email accounts, guest demographics, data on guest devices 110 (e.g., MAC address or other forms of device ID, etc.), financial accounts for deposits, payments, refunds, etc. Stay data 161 may include data for an event such as stay dates, check-in/check-out times, event address, event categories for different types of events (e.g., vacation rental events, restaurant events, casino events, etc.). Data storage 176 may be used as a data store that may be accessed by other components internal to and/or external to networked system 150. Networked system 150 may include more or fewer resources than depicted in FIG. 1B as denoted by 152.

Guest devices (110, 110a) and/or owner devices 113 may communicate (191, 193) with networked system 150 via a Web Site/Web Page 195 (e.g., using a browser or application on a laptop, PC, wireless device, smartphone, pad, tablet, touch screen device, etc.). Information (117, 119, 121, 123) may be viewed, entered, transmitted, received, or otherwise communicated (191, 193) between networked system 150 and another device (e.g., 110, 110a, 113, etc.) using Web Site/Page 195. Reviews, amended reviews or other data associated with event 120 or other events may be communicated via Web Site/Page 195. Network service 150 may require access be granted to a device (e.g., 110, 110a, 113, etc.) prior to allowing data communication with the networked service 150 via Web Site/Page 195.

Moving now to FIG. 1C where examples 170a-170d of a computing device and a portal computing device in communications with a networked system 150 including a networked computing device that receives data transmitted by the computing device and/or portal computing device. In example 170a, a portal device 177 may receive the data 119 from a computing device (e.g., client device 110 via 191 or 193) and transmit the received data 119 via a communications link (191, 193) with a communications interface (CI) 180 of networked system 150. Networked computing device 153 (e.g., a server) may receive the data 119 via the CI 180. Location data 177L associated with portal computing device 177 may be include (e.g., in a data packet or other data structure) communicated over the communications link (191, 193) and networked computing device 153 may use location data originating from the computing device (e.g., client device 110), location data 177 from portal computing device 177, or both to validate location and form validated location data. A portal computing device 177 may include its own data storage resources, computing resources, communications interface, RF systems, and associated algorithms. Data storage resources may be accessed from an external data store such as networked attached storage, external resource 199, SD card, USB thumb drive or other resource, for example.

In example 170b, computing device 110 includes the data 119 and transmits the data (e.g., 191, 193) to networked system 150 via a communications link (191, 193) with CI 180. In example 170b an intermediate communications device, such as portal computing device 177 may not be used for data communications between computing device 110 and networked system 150. Therefore, in some examples data received by networked computing device 153 via CI 180 may be directly communicated by computing device 110 via a communications link (191, 193) between CI 180 and computing device 110.

In example 170c, computing device 110 includes the data 119 and transmits the data (e.g., 191, 193) to portal computing device 117 and the portal computing device 117 transmit the data 119 to the networked computing device 153 via CI 180. Examples 170a and 170c may be similar; however, example 170a includes a scenario where computing device 110 has transmitted the data 119 to portal device 177 and the data 119 may be buffered, queued or stored for later transmission (e.g., in networked attached storage (NAS) SD card or USB thumb drive), or delayed in transmission due to network traffic or network failure. Example 170a may include a scenario where the computing device 110 is no longer in communications range or is no longer linked with portal computing device 177 at the time the portal device 177 transmits the data 119 to networked system 150 via CI 180.

In example 170d, a client device 110 is depicted as one example of a computing device that may transmit data 119 to and/or receive data 117 from networked system 150 via one or more portal computing devices (177a, 177b) in communication (191, 193) with CI 180. Portal computing devices (177a, 177b) may include their own location data 177L as described above. Client device 110 may communicate (191, 193) with portal computing device 177a (e.g., a WiFi access point, such as 130) during one or more periods of time during a duration of an event and with portal computing device 177b (e.g., one or more cellular communications networks, such as 130) at one or more other periods of time during a duration of the event. Location data in the location history data base 147 of client device 110, the location history data base 183 of networked system 150, or both, may be updated, revised, or otherwise modified by changes in location of client device 110 (e.g., due to movement associated with guest 101) as tracked or otherwise logged by one or portal computing devices or by location data from the client device 110 itself. In example 170d, networked computing device 153 may receive data 119 from one or more portal computing devices (e.g., 177a, 177b) and may use the data received from the portal computing devices to authenticate credential data and/or validate location data included in the data 119 and may grant data communications access to the networked computing device 153 and/or other resources in networked system 150 based on the authentication and/or validation.

APP 126 may select one or more portal computing device based on one or more factors including but not limited to data bandwidth (e.g., select the portal computing device with the highest upload speed in Mb/s), portal computing device with the highest signal strength (e.g., 139 in FIG. 1A), data usage cost (e.g., free WiFi or Bluetooth vs. Cellular 3G or 4G), etc., and size of data 119 to be transmitted or received 117. For example, media content in data 119 may have a large data size that may be used by APP 126 to determine which portal computing device to interface with. Those factors may be used to select among multiple portal computing device that may be available for use by client device 110 at the same time (e.g., access to both WiFi via 177a and Cellular via 177b). There may be more or fewer computing devices and/or portal computing devices than depicted in the examples 170a-170d of FIG. 1C as denoted by 125, 175 and 179. Data communication depicted in FIG. 1C may be wired 191, wireless 193 or both.

Figure 3A:
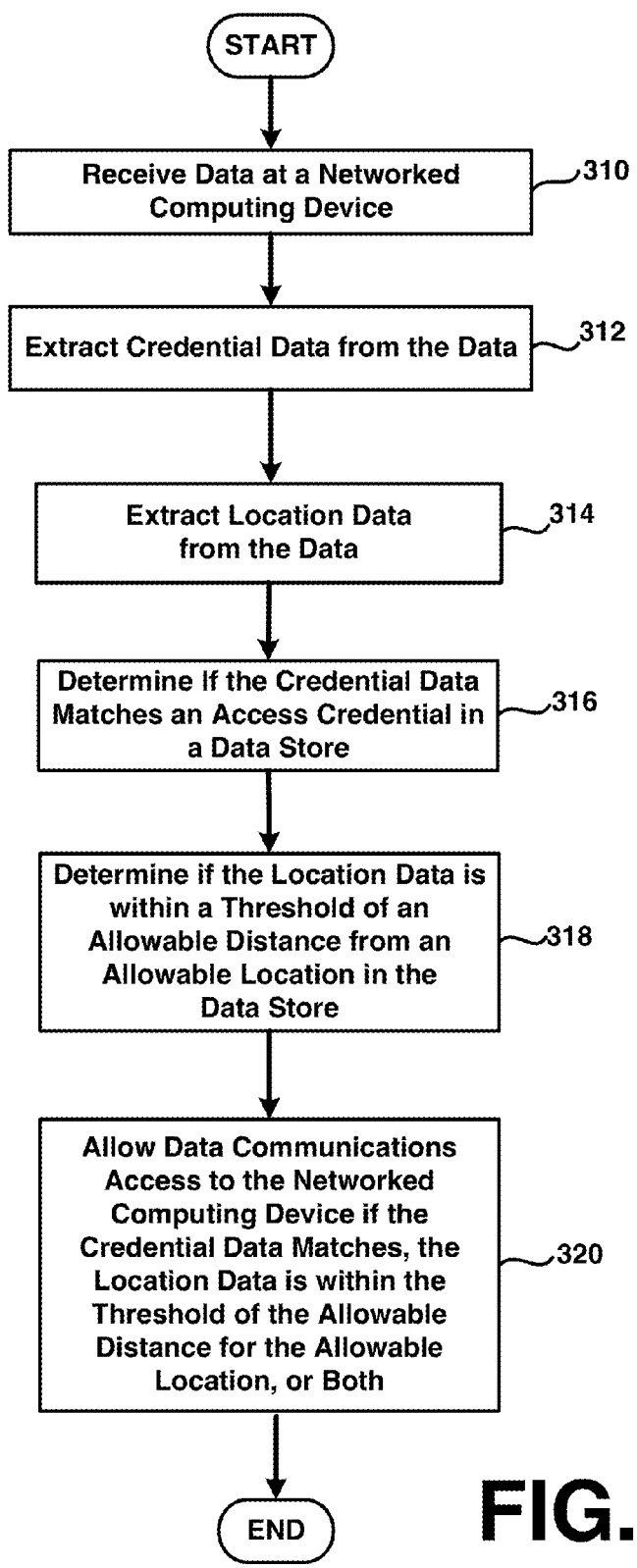
FIG. 3A depicts one example of a flow diagram for receiving data at a networked computing device that validates and/or authenticates the data.

Turning now to FIG. 3A where one example of a flow diagram 300 for receiving data at a networked computing device that validates and/or authenticates the data is depicted. At a stage 310 data (e.g., 119) is received at a networked computing device (e.g., 153, 155, 159). The data may be received via a communications interface (e.g., 180) in communication with the networked computing device. Data 119 may be received from a computing device (e.g., client device 110) and/or from a portal computing device (e.g., 130, 140, 177, 177a, 177b).

At a stage 312, credential data included in the data 119 may be extracted from the data 119 (e.g., extracted at the networked computing device 153). At a stage 314, location data included in the data 119 may be extracted from the data 119 (e.g., extracted at the networked computing device 153). In some examples, the location data may include location data from a computing device (e.g., client device 110) and may include location data from a portal computing device. In other examples, data 119 may include metadata and the metadata may include embedded location data.

At a stage 316 a match between the credential data and an access credential in data storage (e.g., credential data 168) is determined. Credential data may include credential data from the computing device that transmitted the data 119 and the portal computing device from which the data 119 was received from by CI 180.

At a stage 318 a determination is made as to whether or not the location data is within a threshold allowable distance from an allowable location in data storage (e.g., location data 164). The location data may originate from location data collected by APP 126 on client device 110 and/or from location data in portal computing device (e.g., 130, 140, 177, 177a, 177b).

At a stage 320 data communications access to the networked computing device (e.g., 153) by the computing device (e.g., client device 110) is allowed based on the credential data matching the access credentials in data storage, the location data being determined to be within the threshold allowable distance from an allowable location.

Figure 3B:
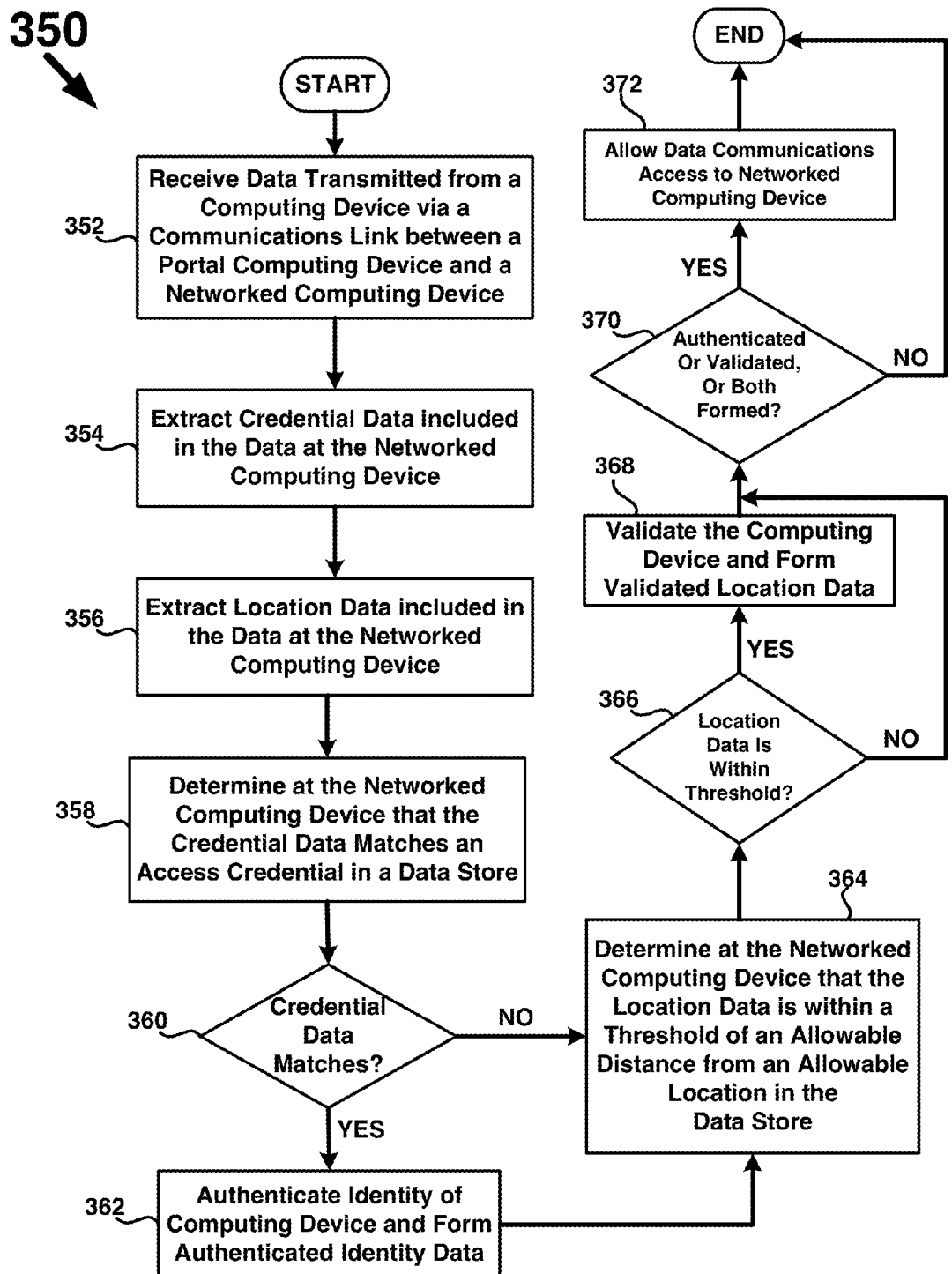
FIG. 3B depicts another example of a flow diagram for receiving data at a networked computing device that validates and/or authenticates the data.

Reference is now made to FIG. 3B where another example of a flow diagram 350 for receiving data at a networked computing device that validates and/or authenticates the data is depicted. At a stage 352 a networked computing device (e.g., 153) may receive data (e.g., 119) from a computing device (e.g., 110) via a communications link (e.g., 191, 193) between the networked computing device and a portal computing device (e.g., 130, 140, 177, 177a, 177b). In other examples, networked computing device (e.g., 153) may receive the data (119) from the computing device (e.g., 110) via the communications link (e.g., 191, 193), as described above in reference to example 170b in FIG. 1B.

At a stage 354, credential data included in the data may be extracted from the data at the networked computing device. At a stage 356, location data included in the data may be extracted from the data at the networked computing device.

At a stage 358 the networked computing device may determine if the credential data matches access credentials in a data store (e.g., credential data 168). At a stage 360 a determination may be made, at the networked computing device, as to whether or not the credential data matched the access credentials in the data store. If there was no match, then a NO branch may be taken to a stage 364. On the other hand, if there was a match, then a YES branch may be taken to a stage 362 where an identity of the computing device that originated the transmission of the data (e.g., 119) may be authenticated and authenticated identity data may be formed. After stage 362 has executed or if the NO branch was taken from the stage 360, flow 350 may transition to another stage, such as the stage 364.

At the stage 364, a determination may be made, at the networked computing device, as to whether or not the location data is within a threshold of an allowable distance from an allowable location in the data store (e.g., location data 164 and/or location history data base 183. At a stage 366, if the location data is not within the threshold distance, then a NO branch may be taken to a stage 370. If a YES branch is taken, then flow 366 may transition to the stage 368.

At the stage 368, the computing device is validated based on the location being within the threshold for an allowable distance for an allowable event and validated location data may be generated. At the stage 370 a determination may be made as to whether or not the credential data was authenticated at the stage 362, whether the location data has been validated at the stage 368, or both. If the credential data was not authenticated at the stage 362 and the location data was not validated at the stage 368, then a NO branch may be taken from the stage 370 and flow 350 may terminate. On the other hand, if one or both of the credential data or location data were authenticated and validated at the stages 362 and 368, respectively, then a YES branch may be taken from the stage 370 to a stage 372.

At the stage 372, data communications access to networked computing device (e.g., 153) is allowed. The allowing of data communications access may include allowing further processing of the data 119 that was received at the stage 352 (e.g., processed to generate a review data file). The allowing of data communications access may include allowing data from one or more resources in networked system 150 to be transmitted to the computing device (e.g., data 117 that is received 117i by client device 110). The allowing of data communications access may include allowing access to the computing device (e.g., client device 110) to a web site or web page 195 provided by networked system 150. The allowing of data communications access may include allowing data from the computing device to be stored or otherwise acted on by one or more resources in networked system 150. The allowing of data communications access may include uni-directional (e.g., one-way) or bi-directional data communications between networked computing device (e.g., 153) and the computing device (e.g., 110).

Figure 4:
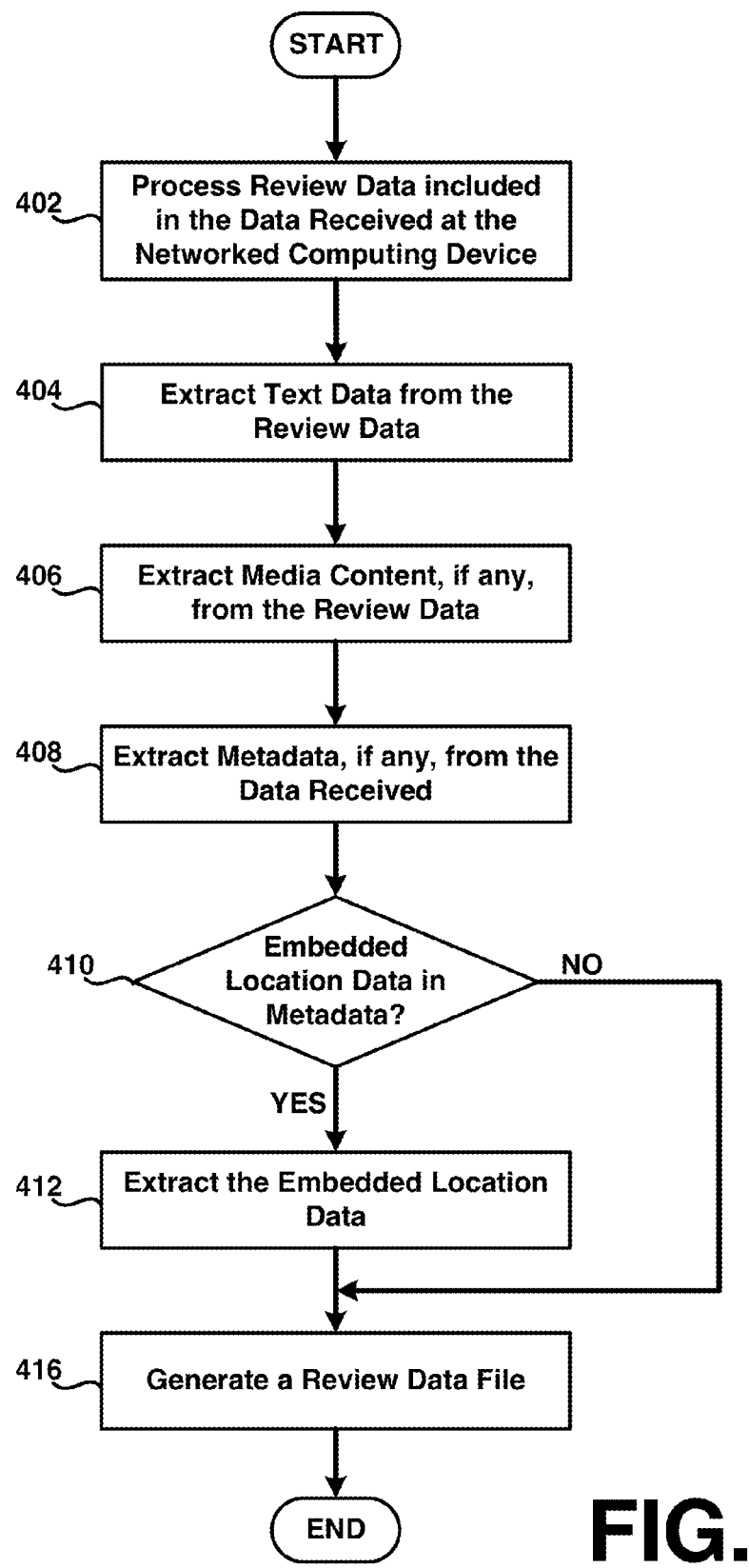
FIG. 4 depicts one example of a flow diagram for generating a review data file.

Referring now to FIG. 4 where one example of a flow diagram for generating a review data file is depicted. At a stage 402 review data included in data received (e.g., 119) by a networked computing device (e.g., 153 in 150) is processed at the networked computing device.

At a stage 404, text data (e.g., free-text, structured-text or both) are extracted at the networked computing device. At a stage 406, media content, if any, that was included in the review data is extracted at the networked computing device. At a stage 408, metadata, if any that was included in the review data is extracted at the networked computing device. In some examples, the metadata may be included media content. In other examples, the metadata may include location data, time data, date data, etc., captured at a time media content was generate (e.g., on client device 110). Metadata may be embedded in other data included in data 119. APP 126 on client device 110 may generate metadata from sources internal to and/or external to client device 110 and that metadata may be included in the data 119, in review data included in data 119, included in media content that is included in the review data, or media content that is included or in the data 119, for example.

At a stage 410 a determination may be made as to whether or not the metadata extracted at the stage 408 includes embedded location data. If embedded location data is included in the extracted metadata, then a YES branch may be taken to a stage 412, where the embedded location data is extracted at the networked computing resource and flow 400 may transition to a stage 416. If embedded location data is not included in the extracted metadata, then a NO branch may be taken to the stage 416.

At the stage 416, a review data file (or amended review data file) may be generated at the networked computing device. The review data file may include formatted data from one or more of the extracted text, extracted media content, extracted metadata, or embedded location data, for example. The embedded location data may be used to update, revise or otherwise modify the location history data base 183 and/or location history data base 147 on client device 110, for example. The review data file may be queued for later publication. The review data file may be communicated to an owner 103 or other interested party (e.g., a proprietor, manager) who's business or establishment may be the subject of a review from an event attended by the guest 101.

Figure 5:
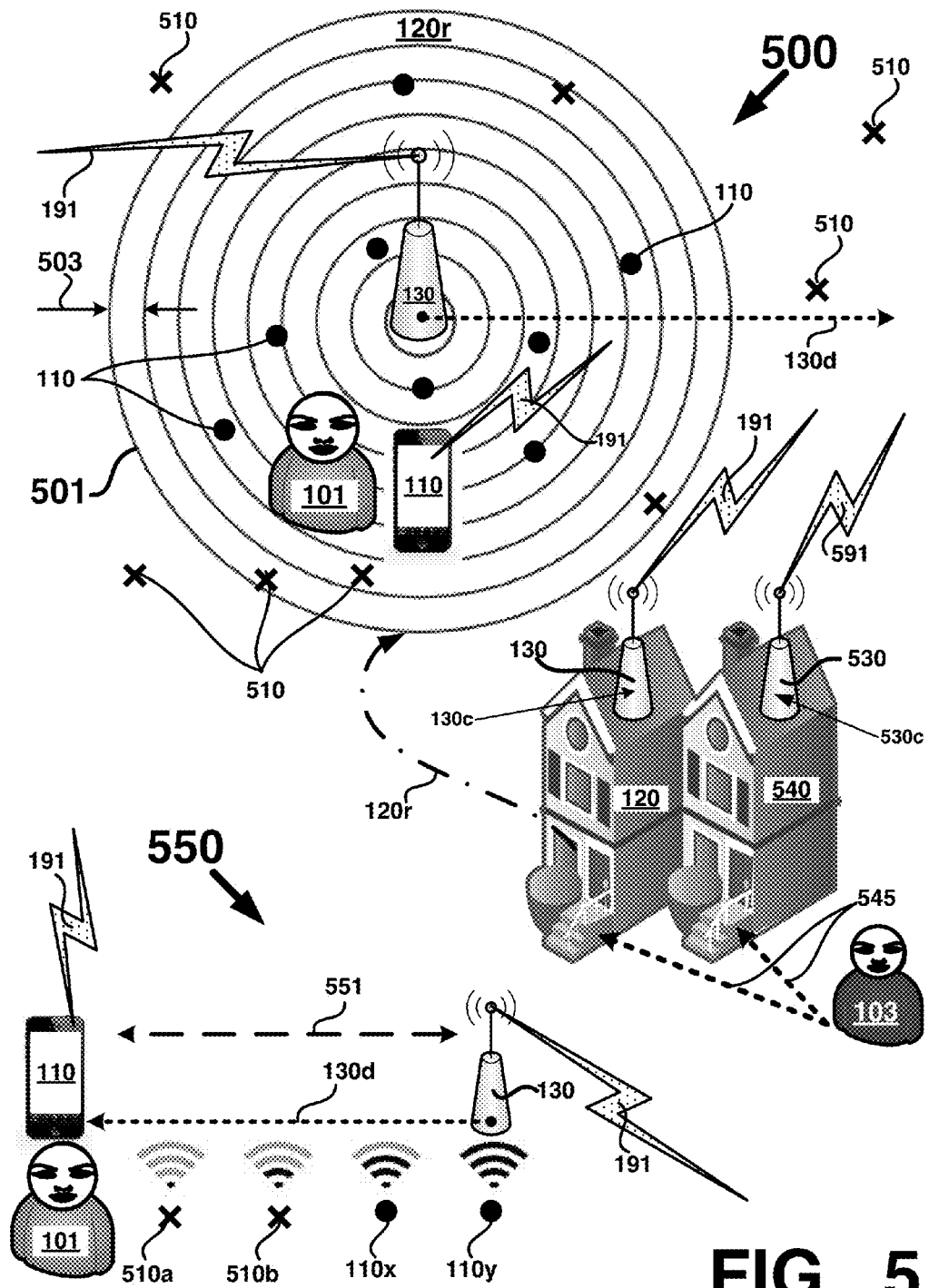
FIG. 5 depicts examples of a threshold for an allowable distance for an allowable location.

Attention is now directed to FIG. 5 where examples 500 and 550 of a threshold for an allowable distance for an allowable location are depicted. In example 500 the event 120 is a stay at a vacation rental unit where guest 101 and his/her client device 110 are present. WiFi access point (e.g., a portal computing device) is positioned in the rental unit and includes access credentials 130c. Concentric circles 501 depict a radial distance 130d centered about access point 130 (e.g., in a room 120r of the vacation rental) where a threshold for an allowable distance denoted as a black dot "•" for device 110, for an allowable location (e.g., event 120) may be used by networked computing device (e.g., 153, 155, 159) to validate location data and form validated location data as described above in reference to FIGS. 3A and 3B, for example. For purposes of explanation a distance 503 between adjacent circles in 501 may be 3 meters, for example. Distances that are not an allowable distance are denoted by a "x" 510 and some of those distances may fall outside of circle 501.

For example, as a distance of the client device 110 increases along direction of the arrow for radial distance 130r, locations associated with "x" 510 may increase; whereas, as a distance of the client device 110 increases along direction of the arrow for radial distance 130r, locations associated with "•" 110 may increase.

In example 550, as the client device 110 moves closer to or further away from access point 130 as denoted by dashed line 551, a RF signal parameter may change as a function of distance along 130d. As an example, RSSI or RF signal strength associated with 1-bar 510a or 2-bars 510b for "x" 510 may be indicative of the client device 110 being outside the allowable distance. On the other hand, at closer distances to access point 130, RSSI or RF signal strength associated with 3-bars 110x or 4-bars 110y for "•" 110 may be indicative of the client device 110 being inside the allowable distance. As another example, review data and/or media content in review data captured by client device 110 at "x" 510 may result in the data 119 not being validated as to location and data communications access to the networked computing device may be denied. However, review data and/or media content in review data captured by client device 110 at "•" 110 may result in the data 119 being validated as to location and data communications access to the networked computing device may be allowed. Hardware, software, circuitry, RF systems or the like in access point 130 may include signal strength data indicative of a relatively strong signal (e.g., 4 to 5 bars), an adequate signal (e.g., 3 bars), or a relatively weak signal (e.g., one to two bars) in data 119. The signal strength data may be used by the networked computing device to validate the location data. APP 126 may access systems of client device 110 (e.g., RF system) and include signal strength data 139 in the data 119 and that may be may be used by the networked computing device to validate the location data.

Further to example 500, an owner 103 may own 545 both rental units depicted (e.g., 120 and 540). An access point 530 with access credentials 530c in rental unit 540 may be detected by and may even be accessed by client device 110 of guest 101. For example, another guest in 540 may give the access credentials for access point 530 to guest 101. However, data 119 transmitted by client device 110 using access point 530 may not be authenticated due to the credential data in 119 not matching the access credentials assigned to event 120. Use by guest 101 of access point 530 to communicate data 119 to/from networked computing device may result in credential data not being authenticated and data communications access being denied. For example, review data included in the data 119 may be rejected by networked computing device due the data 119 not originating from a location and/or credentials associated with event 120.

Figure 6:
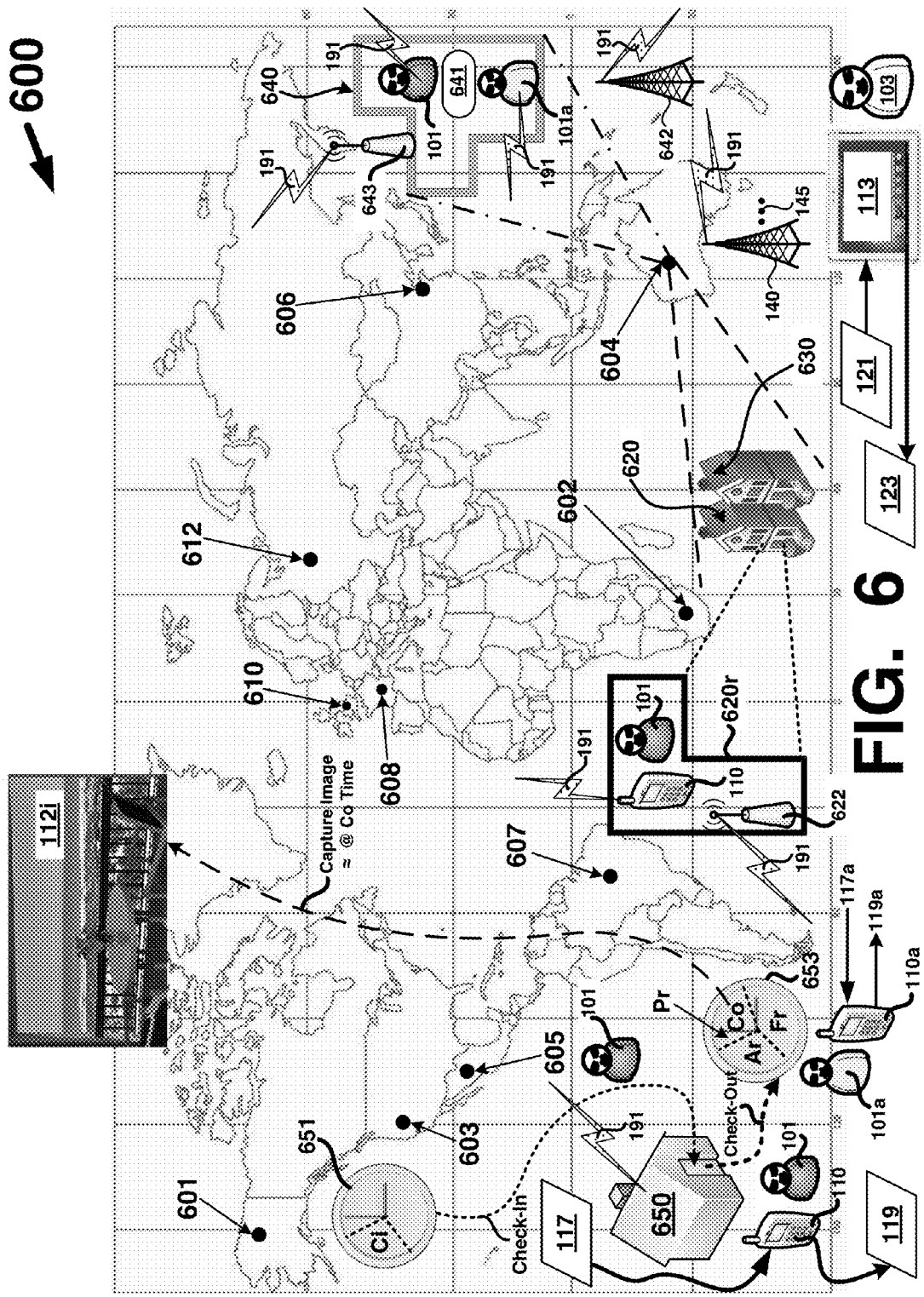
FIG. 6 depicts examples of locations for events.

Attention is now directed to FIG. 6 where examples 600 of locations for events 601-612 are depicted. Events 601-612 may be stays at vacation rental properties in locations such as 601 in Alaska, 603 in California, 605 in Mexico, 607 in Brazil, 602 in South Africa, 604 in Australia, 606 in China, 608 in France, 610 in the United Kingdom, and 612 in Russia. Associated events may occur in a locale of the events 601-612. Each event location (e.g., city, town, venue, etc.) may include a plurality of events that are occurring at the same time, and some of the events may be in the same general location (e.g., Union Square in San Francisco, Calif.) of one another.

For events that are related to stays at a rental property, there may be standard terms for occupancy, such as a stay date range and check-in and check-out times. As one example, for an event 650, on the beginning date of the stay, the guest 101 has a check-in time Ci denoted on clock 651 and the guest 101 enters the event 650 (e.g., a stay at a rental home) at that check-in time. Clock 653 denotes a check-out time Co for the guest to exit the event 650 on the ending date for the stay where the guest 101 ends occupancy of the event 650.

The event 650 may include communications access 191 for client device 110 that may be used by the guest 101 to enter review data using client device 110. Prior to the check-out time Co the APP 126 on executing on client device 110, the networked system 150 or both may prompt a review Pr of the event by signaling or otherwise messaging the guest 101 to generate a review of his/her stay at the event 650 contemporaneously with the stay, that is, before the guest 101 actually checks-out Co. The prompt for the review Pr may include a prompt for the guest 101 to capture an image of a favorite or memorable aspect of the stay at the event 650, such as a picture 112i of an ocean/beach view from a room at the event 650 (e.g., a bedroom balcony). The prompt for the review Pr may be timed for activation by the APP 126 at a time before the check-out time Co (e.g., one to two hours before Co) or be included in incoming data 117 received by client device 110, for example. After the guest has captured the image 112i (e.g., at a time approximately at or around check-out time) and entered review text and/or vocal commentary, the review data may be transmitted (e.g., 119) to networked system 150 for processing and subsequent formatting Fr of the review for publication. The prompt for the review Pr may occur while the guest 101 is still in-situ at event 650 and may occur minutes or hours before the designated check-out Co time.

An advantage of the in-situ evaluation of the event before the guest 101 has departed the event 650 is that feelings, impressions, experiences associated with the stay at the event 650 may still be fresh and/or strong in the mind of the guest 101 and/or an guest 101a and therefore may lead to a more accurate and positive review than would be the case if the guest 101 and/or guest 101a submitted the review at a later date (e.g., days or weeks later). If the owner 103 provided a five-star property for event 650 and the guest 101 at the time of the stay also feels the event 650 is worthy of a five-star review, then the best time to capture that sentiment may be in-situ while the guest 101 is still present at the event 650. Similarly, guest 101a may also have a similar sentiment and the best time to capture that sentiment may be while the guest 101a is in-situ at the event 650. Guest 101a may have client device 110a and that device may receive data 117a and transmit data 119a and the guest 101a may be prompted Pr to generate an in-situ review in a manner similar to that for guest 101.

Another advantage of the in-situ evaluation of events is that after the submission of the event (e.g., by transmitting data 119, 119a), the networked system 150 may process the received review data and format the review Fr for publication. Therefore, at some time after check-out Co (e.g., minutes to hours later), a formatted review may be ready for publication to a broader audience. Owner 103 may receive notice and a copy of the formatted review Fr for consideration and may take action to cure any issues that arose during the guest's 101 stay at the event and/or negotiate with the guest 101 to amend the review Ar, prior to its publication in its present form. The time from prompting the review Pr to publishing the formatted review Fr in its original or amended form Ar may be a matter of a few hours or less instead of days or weeks as may be the case when a guest 101 submits a review long after the guest 101 has departed the event 650. The review captured in-situ may be more accurate as the guest 101 may be in a good mood while still at the event 650 and that mood may change post event and lead to an inaccurate review.

Further to example 600, an event in location 604 may include a stay at a town house rental property denoted as event 620. A room 620r at the event 620 may include a wireless access point 622 that may communicate wirelessly with client device 110, networked system 150 and/or external resource 199 (not shown). Prior to check-out time Co from event 620, guest 101 may capture in-situ media content and enter review textual content while present at event 620 (e.g., from inside room 620r). Location data and/or credential data may be included in the review data (e.g., 119) communicated by APP 126 via client device 110 and that data may be verified by networked system 150 (e.g., the location data is consistent with the client device being within a locus of the location for event 620 and/or room 620r). Similarly, credential data may be verified by wireless device address of client device 110 being received by access point 622, by RSSI, by access credentials stored in memory of client device 110 being accessed by APP 126 and included in the data 119 received by networked system 150, for example. While at location 604, guest 101 and/or guest 101a may be mobile and may travel to other events at location 604, such as a restaurant event 640 in which guest 101 and guest 101a are seated at a table 641. Wireless access point 643 may communicate 191 with client devices (110, 110a) and with networked system 150 to verify credential and location data associated with a review of the restaurant event 640 by the guest 101/101a. During stay at location 604 other communications resources, such as cellular networks 642 and/or 140 may be used to verify location data (e.g., the client device 110 associated with guest 101 is in vicinity of one or more of the cellular networks 642 and/or 140b). Multiple cellular networks 642 may be used to fix a location for devices 110/110a using triangulation or other techniques. Data (117, 119) may be communicated to/from networked system 150 and/or client device 110 using one or more of the cellular networks. Location based services accessible by client devices (110, 110a) and/or APP 126 may be used to access location data for use in verifying location for reviews or other purposes.

A review of restaurant event 640 may be in-situ and be formatted and queued for publication in a manner similar to that described above. A push message (e.g., in data 117) may be received by APP 126 on client device 110 and that message may include information on the restaurant event 640 that may be used to inform the guest 101 of the location, menu, hours of operation, contact information, prices, etc. for the restaurant event 640. The push message may include a discount, offer or other incentive for the guest 101 to motivate the guest 101 to patronize the restaurant event 640. Owners of venues such as the restaurant event 640, for example, may receive formatted reviews prior to publication and may take action to cure grievances and/or amend reviews.

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. A method, comprising:
    receiving data transmitted from a computing device via a communications link between a networked computing device and a portal computing device;
    determining at the portal computing device that a radio frequency signal strength associated with the data transmitted from the computing device is above a threshold value;
    extracting credential data from the data at the networked computing device;
    extracting location data from the data at the networked computing device, the location data describing a location of the computing device;
    determining at the networked computing device, based on the radio frequency signal strength being above the threshold value, that the credential data matches an access credential in a data storage resource to authenticate an identity and to form authenticated identity data;
    determining at the networked computing device that the location data is within a threshold of an allowable distance from an allowable location in the data storage resource to validate the computing device and to form validated location data; and
    allowing data communications access to the networked computing device based on either the authenticated identity data, the validated location data, or both.

2. The method of claim 1, wherein the portal computing device receives the data from the computing device via a first communications link between the portal computing device and the computing device.

3. The method of claim 1, wherein the data is generated by an application on the computing device, the application operative to cause the data to be transmitted by a communications interface of the computing device to the portal computing device via the communications link.

4. The method of claim 1, wherein the location data includes information associated with a geographical location of the portal computing device.

5. The method of claim 1, wherein the location data includes information associated with a geographical location of the computing device.

6. The method of claim 1, wherein allowing the data communications comprises:
    accessing the authenticated identity data; and
    applying a first weighting factor to the authenticated identity data when the determining authenticates identities of a plurality of computing devices, the plurality of computing devices including the computing device and the portal computing device, and the first weighting factor is greater than a second weighting factor for the validated location data.

7. The method of claim 1, wherein allowing the data communications comprises:
    accessing the validated location data; and
    applying a first weighting factor to the validated location data when the determining validates that a plurality of computing devices are within the threshold of the allowable distance from the allowable location, the plurality of computing devices including the computing device and the portal computing device, and the first weighting factor is greater than a second weighting factor for the authenticated identity data.

8. The method of claim 1, wherein allowing the data communications comprises:
accessing the validated location data; and
applying a first weighting factor to the validated location data when the determining further indicates the location data is within a first threshold of a first allowable distance from a first allowable location in a location history database, and the first weighting factor is greater than a second weighting factor for the authenticated identity data.

9. The method of claim 1, wherein the allowing includes processing at the networked computing device, review data included in the data to generate a review data file.

10. The method of claim 9, wherein the processing includes extracting, for inclusion in the formatted review, free text, structured text, and media content, if any, from the review data.

11. The method of claim 1, wherein the data includes metadata, the metadata includes embedded location data, and the determining includes extracting the embedded location data from the metadata to validate the computing device.

12. The method of claim 1, wherein the location data includes information associated with a geographical location of the computing device, information associated with a geographical location of the portal computing device, or both.

13. A system, comprising:
a computing resource;
a data storage resource; and
a communications interface in communication with the computing resource and the data storage resource, the computing resource configured to execute instructions embodied in a non-transitory computer readable medium to:
receive data via the communications interface,
determine that a radio frequency signal strength associated with the data received at the communications interface is above a threshold value,
determine, based on the radio frequency signal strength being above the threshold value, if credential data included in the data matches an access credential in the data storage resource to authenticate an identity and to form authenticated identity data,
determine if location data included in the data is within a threshold of an allowable distance from an allowable location in the data storage resource to validate a computing device that communicated the data and to form validated location data, and
allow data communications access to the computing resource, the data storage resource, or both, via the communications interface, based on either the authenticated identity data, the validated location data, or both.

14. The system of claim 13, wherein the data is received from a portal computing device.

15. The system of claim 13, wherein the computing device comprises a client device.

16. The system of claim 13, wherein the data is received from a portal computing device, and the portal computing device received the data from the computing device via a communications link between the portal computing device and the computing device.

17. The system of claim 13, wherein after data communications access has been allowed, review data included in the data is processed at the computing resource to generate a review data file.

18. The system of claim 13, wherein after data communications access has been allowed, media content and review data included in the data are processed at the computing resource to generate a review data file.

19. The system of claim 13, wherein the data communication access is allowed based on the authenticated identity data due to a first weighting factor applied to the authenticated identity data when the computing resources determines that identities of a plurality of computing devices have been authenticated, the plurality of computing devices includes the computing device and a portal computing device, and the first weighting factor is higher than a second weighting factor for the validated location data.

20. The system of claim 13, wherein the data communication access is allowed based on the validated location data due to a first weighting factor applied to the validated location data by the computing resources when the computing resources determines that a plurality of computing devices are within the threshold of the allowable distance from the allowable location, the plurality of computing devices includes the computing device and a portal computing device, and the first weighting factor is higher than a second weighting factor for the authenticated identity data.

* * * * *